United States Patent [19]

Lin

[11] Patent Number: 5,503,251

[45] Date of Patent: Apr. 2, 1996

[54] STRADDLE YOKE ASSEMBLY FOR BICYCLES

[75] Inventor: David Lin, Chang Hwa, Taiwan

[73] Assignee: Yih Jina Enterprise Co., Ltd., Chang Hwa, Taiwan

[21] Appl. No.: 425,206

[22] Filed: Apr. 20, 1995

[51] Int. Cl.⁶ ..................................................... B62L 3/00
[52] U.S. Cl. ................... 188/24.21; 188/2 D; 188/24.12
[58] Field of Search ............................... 188/24.21, 2 D, 188/24.19, 24.22, 24.18, 24.11, 24.12, 24.17, 24.16, 24.14, 24.13; 74/502.6, 502.4

[56]  References Cited

U.S. PATENT DOCUMENTS

| | | | |
|---|---|---|---|
| 4,027,746 | 6/1977 | Kihe | 188/24.21 |
| 5,293,965 | 3/1994 | Nagano | 188/24.21 |
| 5,373,918 | 12/1994 | Nagano | 188/24.21 |
| 5,390,767 | 2/1995 | Nagano et al. | 188/24.21 |

*Primary Examiner*—Douglas C. Butler
*Attorney, Agent, or Firm*—Alfred Lei

[57] ABSTRACT

A straddle yoke assembly for a bicycle including a seat having a body portion formed with a recess, a groove having a first outlet at an end thereof and two second outlets at another end thereof, a plurality of protuberances, and a tubular member connected at an end thereof with the first outlet, a cover formed at a central portion thereof with a raised portion having a through hole and at a circumferential portion with a plurality of openings adapted to engage with the protuberances of the seat, a L-shaped rod provided with threads at both ends, a spring put over the L-shaped rod, a first cable provided with two barrel nipples one at each end thereof, and a second cable passing through the tubular member of the seat and engaged with a brake arm of the cantilever brake at an end thereof and the brake lever at another end thereof.

1 Claim, 4 Drawing Sheets

STRADDLE YOKE ASSEMBLY FOR BICYCLES

BACKGROUND OF THE INVENTION

1. Field of the Invention

This invention relates to an improved straddle yoke assembly for bicycles.

2. Description of the Prior Art

It has been found that the conventional straddle yoke assembly is manufactured by die casting thereby increasing the cost. Furthermore, it is difficult and time-consuming to engage the seat with the tubular member. In addition, rain drop will drip into the tubular member through an opening of the seat thus rusting the cable and therefore shortening the life span thereof.

Accordingly, it is an object of the present invention to provide a straddle yoke assembly which can obviate and mitigate the above-mentioned drawbacks.

SUMMARY OF THE INVENTION

This invention relates to an improved straddle yoke assembly for bicycles.

It is the primary object of the present invention to provide a straddle yoke assembly for bicycles which is easy to assemble.

It is another object of the present invention to provide a straddle yoke assembly for bicycles which is low in cost.

It is still another object of the present invention to provide a straddle yoke assembly for bicycles which is facile to manufacture.

It is still another object of the present invention to provide a straddle yoke assembly for bicycles which is convenient to maintain.

It is a further object of the present invention to provide a straddle yoke assembly for bicycles which is practical is use.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
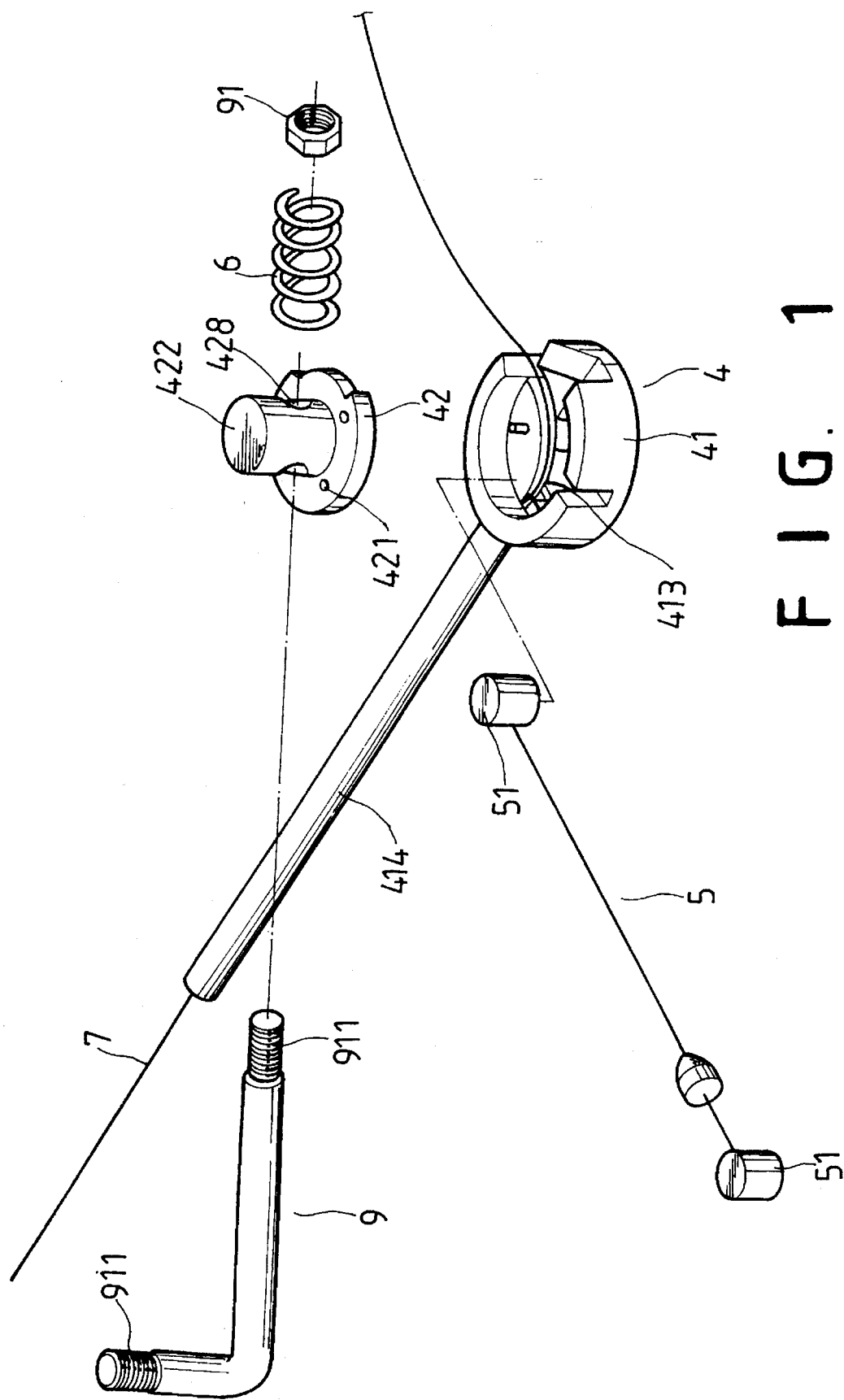
FIG. 1 is an exploded view of the present invention.

For the purpose of promoting an understanding of the principles of the invention, reference will now be made to the embodiment illustrated in the drawings. Specific language will be used to describe same, It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
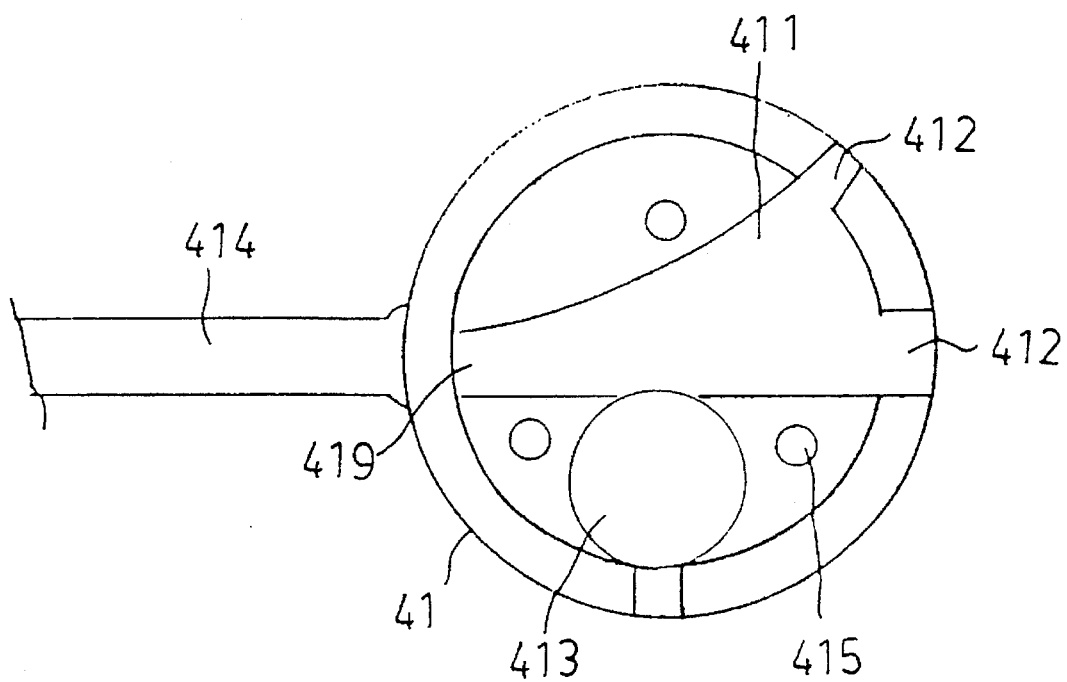
FIG. 2 is a top view of the seat.
Figure 3:
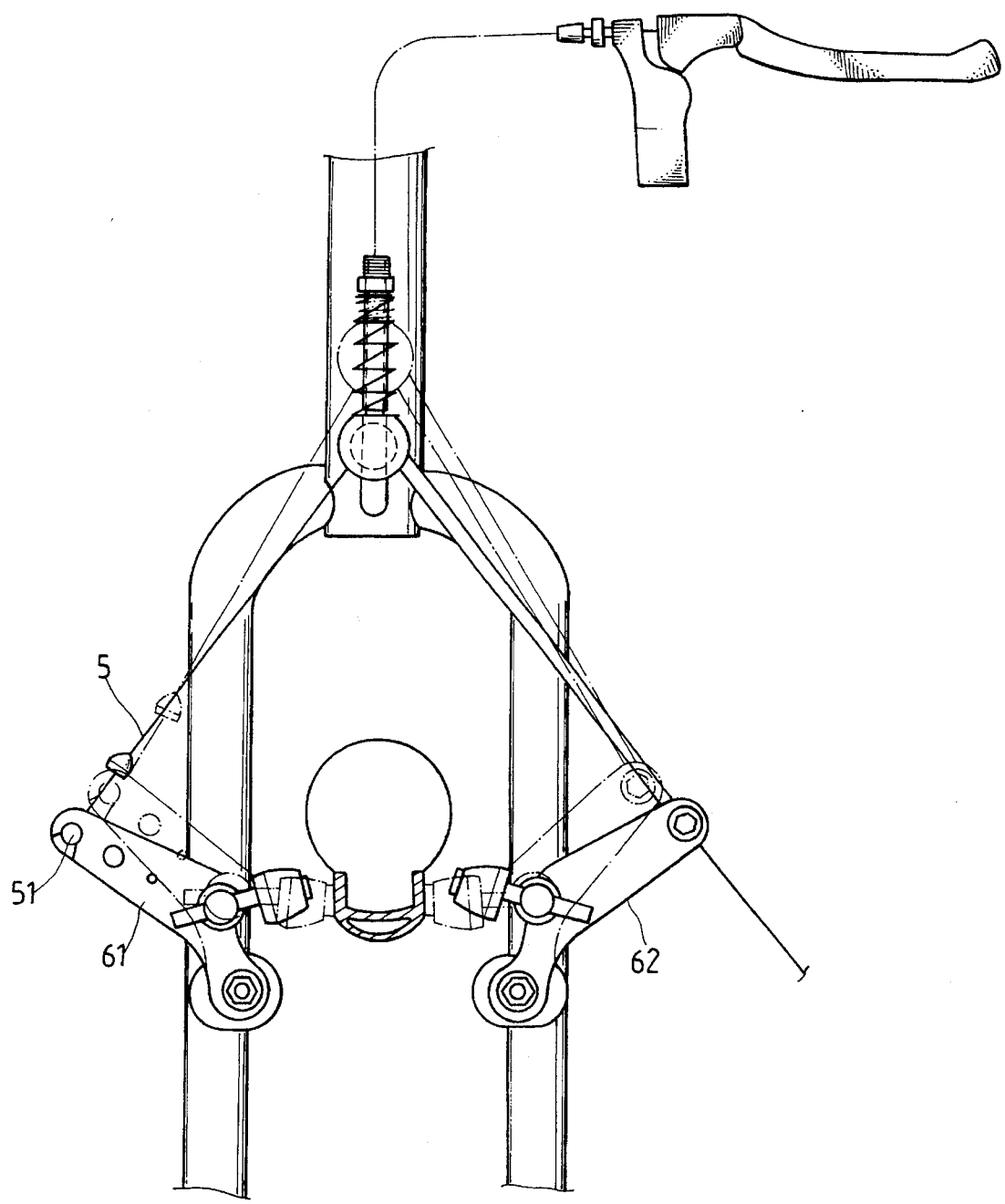
FIG. 3 illustrates how the present invention works.

With reference to the drawings and in particular to FIGS. 1, 2, and 3 the straddle yoke assembly according to the present invention comprises a seat 4, a cover 42, a L-shaped rod 9, a spring 6, a first cable 5, and a second cable 7.

As illustrated, the seat 4 includes a body portion 41 formed with a circular recess 413, a groove 411 having an outlet 419 at one end and two outlets 412 at the other end, a plurality of protuberances 415, and a tubular member 414 connected at one end with the outlet 419.

The cover 42 is formed at the central portion with a raised portion 422 having a through hole 428 and at the circumferential portion with a plurality of openings 421 adapted to engage with the protuberances 415 of the seat 4.

Figure 4:
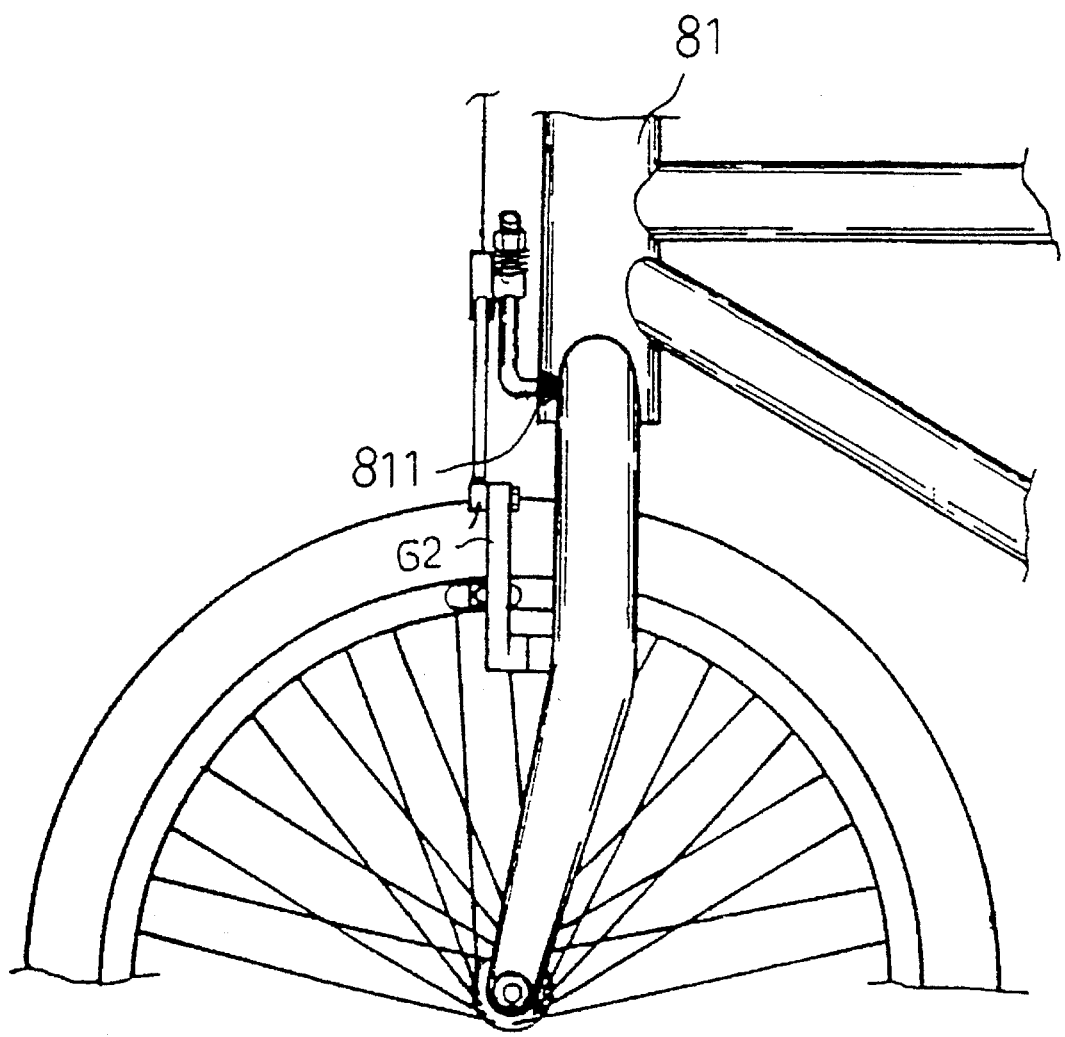
FIG. 4 is a working view of the present invention.

The L-shaped rod 9 is provided with threads 911 at both ends thereof. Further, the L-shaped rod 9 goes through the hole 428 of the cover 42 and the spring 6 to engage a nut 91 at one end and engage with a threaded hole 811 of a head tube 81 (see FIG. 4).

The first cable 5 is provided with a barrel nipple 51 at both ends. A barrel nipple 51 of the first cable 5 is engaged with the circular recess 413, while the other barrel nipple 51 of the first cable 5 with a first brake arm 61 of a cantilever brake.

The second cable 7 passes through the tubular member 414 and the groove 411 of the seat 4 and is engaged with a second brake arm 62 of the cantilever brake at one end and a brake lever (not shown) at the other end.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. The straddle yoke assembly for a bicycle comprising:

said bicycle including a cantilever brake having a first brake arm, a second brake arm, and a brake lever;

a seat having a body portion formed with a recess, a groove having a first outlet at an end thereof and two second outlets at another end thereof, a plurality of protuberances, and a tubular member connected at an end thereof with the first outlet;

a cover formed at a central portion thereof with a raised portion having a through hole and at a circumferential portion with a plurality of openings adapted to engage with the protuberances of said seat;

a L-shaped rod provided with threads at both ends, said L-shaped rod extending through the hole of said cover to engage with a nut;

a spring put over said L-shaped rod and arranged between said nut and said seat;

a first cable provided with two barrel nipples one at each end thereof, one of said barrel nipples being engaged with the recess of said seat while another one of said barrel nipples being engaged with the first brake arm of said cantilever brake; and a second cable passing through the tubular member of said seat and engaged with the second brake arm of said cantilever brake at an end thereof and the brake lever at another end thereof.

* * * * *